United States Patent [19]
Gentilman

[11] Patent Number: 4,686,128
[45] Date of Patent: Aug. 11, 1987

[54] LASER HARDENED MISSILE CASING

[75] Inventor: Richard L. Gentilman, Acton, Mass.

[73] Assignee: Raytheon Company, Lexington, Mass.

[21] Appl. No.: 750,944

[22] Filed: Jul. 1, 1985

[51] Int. Cl.$^4$ .............................................. B32B 3/30
[52] U.S. Cl. ...................................... 428/44; 89/1.11; 244/121; 244/158 A; 428/54; 428/167; 428/408; 428/902; 428/920
[58] Field of Search .................. 428/408, 902, 920, 44, 428/54, 167; 244/117 A, 121, 133, 158 A; 102/465; 89/1.11

[56] References Cited
U.S. PATENT DOCUMENTS

| | | | |
|---|---|---|---|
| 3,596,604 | 8/1971 | Corkery | 102/105 |
| 3,745,928 | 7/1973 | Kinnaird et al. | 102/105 |
| 4,124,732 | 11/1978 | Leger | 428/77 |
| 4,323,012 | 4/1982 | Driver, Jr. | 102/465 |
| 4,338,368 | 7/1982 | Dotts et al. | 428/212 |
| 4,428,998 | 1/1984 | Hawkinson | 428/902 |
| 4,431,697 | 2/1984 | Rolinski et al. | 428/242 |
| 4,482,111 | 11/1984 | Le Touche | 244/117 A |

Primary Examiner—Paul J. Thibodeau
Attorney, Agent, or Firm—Denis G. Maloney; Richard M. Sharkansky

[57] ABSTRACT

A thermally protective covering for a structure includes a thermally ablating layer comprising a nonporous ablative material comprising pyrolytic graphite or carbon composites bonded to a rigid, nonporous insulating layer comprising composites having high strength fibers in an insulating matrix. The insulating layer is bonded to the casing of the structural element to be protected. More preferably, the thermally ablating layer comprises pyrolytic graphite and the rigid, nonporous insulating member comprises silica phenolic. The ablating layer is bonded to the insulating layer with a high temperature graphite cement having adhesive properties to at least 3000° K. In a preferred embodiment, means are provided for venting pyrolysis gas produced during exposure of the ablating layer to a high energy laser.

20 Claims, 6 Drawing Figures

LASER HARDENED MISSILE CASING

The Government has rights in this invention pursuant to Contract No. MDA 903-82-C-0359 awarded by the Defense Supply Agency (DARPA), Washington, D.C.

BACKGROUND OF THE INVENTION

This invention relates generally to thermally protective layers and, more particularly, to a thermal protective layer suitable for protection of a missile or air frame casing structure against a high intensity laser weapon.

As is known in the art, recent developments in laser technology have provided high intensity laser systems which make missiles, aircraft, spacecraft, and other structures vulnerable to laser attack. Accordingly, it is necessary to provide a system for making substantially invulnerable the outer structure or casing of existing and future missile, aircraft, spacecraft or the like, thereby protecting critical components of the system including propulsion and guidance systems, fuel and payload.

It is known in the art that to protect a structure from a high energy weapon such as a laser, an ablating layer is generally provided to dissipate the energy of the laser. Ablation is a known phenomenon by which energy incident upon an ablating material is dissipated through vaporization of the material rather than by conversion of the energy into heat. That is, during exposure to the laser beam, the material of the ablating layer is vaporized away dissipating the laser energy by converting the solid material of the ablative layer into a vapor. However, ablation is but one phenomena which occurs during exposure of an ablating layer to a laser weapon. It is also known that some heat is generated in the ablating layer which can conduct through the ablating layer towards the structure to be protected. Typically, existing missile casings for example, are fabricated of light weight metals, such as aluminum. Aluminum becomes mechanically weakened at temperatures in excess of about 550° K. Accordingly, conduction of thermal energy through the ablating layer to a missile casing comprised of such a material as aluminum will cause a build-up of heat at the missile casing which will mechanically weaken the missile casing.

A second problem caused by the heat generated during ablation of the outer layer is that the generated heat causes releasing or outgassing of gaseous components from the materials used to attach the ablating layer to the missile casing. Outgassing of these components can cause bond failures between the ablating layer and the missile casing, and thereby hastening the effect of the laser upon the missile.

Several solutions to some of these problems have been described in the art. One solution, for example, as described in U.S. Pat. No. 4,431,697 for a composite missile casing includes a pair of thermally protective layers comprising a cork composition layer, such as a cork phenolic which may in alternate configurations comprise carbon phenolic, silica phenolic, carbon nitrile or epoxy novalac coatings. Sandwiched between the pair of thermally protective layers is an adhesively bonded laser hardening barrier. The laser hardening barrier comprises a heavy metal bearing resin impregnated carbon fabric. One problem with the abovementioned solution is the requirement of having three composite layers. A second problem is that the intermediate layer comprising the heavy metal bearing resin impregnated carbon fabric does not have the mechanical strength, particularly interply tensile strength, of the pair of cork phenolic layers, in particular, the silica phenolic layer. That is, the heavy metal bearing resin impregnated carbon fabric may have insufficient tensile strength to carry the load of the outer cork phenolic layer attached thereto. This could aid in causing bond failure between the cork phenolic outer layer and the laser barrier layer.

A further problem with the above-described solution is that heating of the outer cork composition layer may cause a build-up of outgaseous products at the bonding interface between the cork insulating layers and the laser hardened barrier. Further, the use of a heavy metal such as tungsten adds weight to the layer and hence the missile and further is expensive.

SUMMARY OF THE INVENTION

In accordance with the present invention, a thermally protective covering for a structure includes a thermally ablating layer comprising a nonporous ablative material such as pyrolytic graphite or a carbon composite comprising carbon fibers in a carbon matrix which is bonded to a rigid, nonporous thermally insulating layer such as a composite comprising high strength or high modulus fibers such as silica, glass or "Kelvar" (Dupont Company, Wilmington, Del.) generally known as aramide, incorporated into a thermally insulating matrix such as phenolic or epoxy. The thermally insulating layer is bonded to the casing of the structural element to be protected. More preferably, the thermally ablating layer comprises pyrolytic graphite and the rigid, nonporous thermally insulating layer comprises silica phenolic. With this arrangement, a nonporous ablative layer such as the pyrolytic graphite increases the ablation performance of the thermally protective layer. Further, pyrolytic graphite being a nonisotropic material will provide reduced thermal conductivity in a direction perpendicular to the surface of the structure and high thermal conductivity in a direction parallel to the surface of the structure. Furthermore, the use of a silica phenolic as an insulator layer increases the mechanical strength of the thermally protective layer, thereby allowing the silica phenolic insulator layer to carry the load of the pyrolytic graphite layer. Furthermore, by providing the pyrolytic graphite layer as the ablating layer rather than the silica phenolic layer as an ablative layer, increased ablation performance is provided over prior techniques.

In accordance with a further aspect of the present invention, a thermally protective covering for a structural casing comprises a plurality of tiles, each tile includes a thermally ablating layer and a thermally insulating layer comprising a rigid, nonporous thermally insulating material. The thermally insulating layer has a first surface having a plurality of channels disposed therein which terminate at edges of the insulating layer. The first surface of the insulating layer is bonded using a suitable bonding material to the ablating layer to provide the tiles, while the channels in the insulating layer are kept free of the bonding material. The tiles are bonded to the casing and arranged to provide gaps between pairs of adjacent edges of corresponding adjacent tiles. With this arrangement, the gaps provided between adjacent edges of adjacent tiles and the channels provided in the bonding surface of the insulating layer allow for venting of pyrolysis gases produced during ablation of the ablating layer. Furthermore, the edges of each one of the tiles are mortised and tenoned to eliminate any line of sight exposure of the structural casing to a laser beam while still providing gaps between the adjacent tiles for venting of pyrolysis gases. With this arrangement, the bond between the thermally ablative layer and the rigid, nonporous insulating layer is protected from failure due to build-up of pyrolysis gases during ablation of the thermally ablating layer.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENTS

Figure 1:
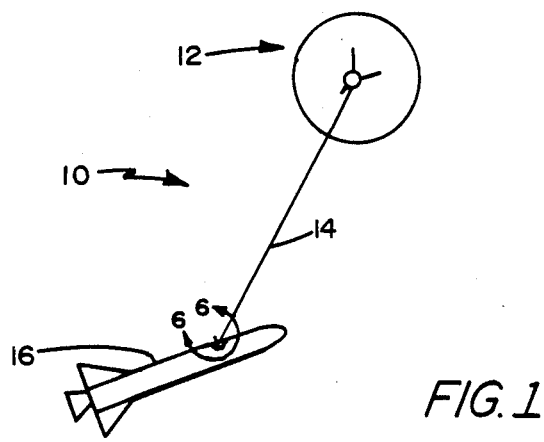
FIG. 1 is a diagrammatical view of a typical scenario which may be encountered during flight of a vehicle for which the present invention provides protection.

Referring now to FIG. 1, a typical scenario 10 involving a laser source 12 typically located in space attacking a missile 16 in flight is shown. A laser beam 14 from source 12 impinges upon the surface of the missile 16. The intent of attack by the laser source 12 on the missile surface 16 is to heat the missile casing causing mechanical and hence aerodynamic failure of the missile resulting in destruction of the missile or prevention of the missile from successful completion of its mission.

Figure 2:
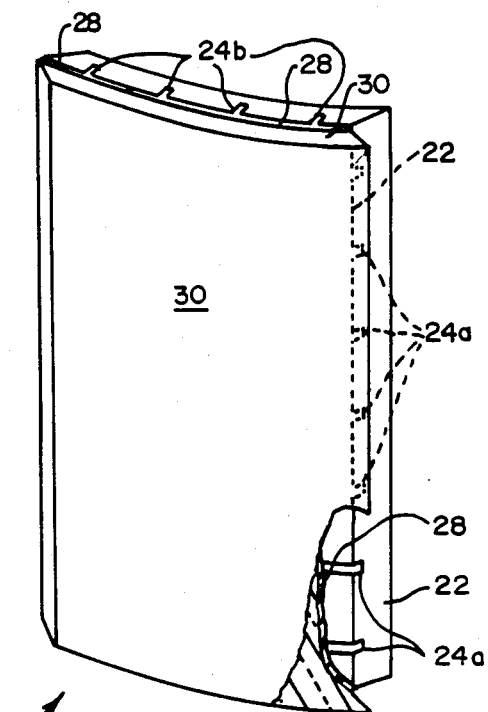
FIG. 2 is an isometric view of a tile for use as a thermally protective layer in accordance with the present invention.
Figure 3:
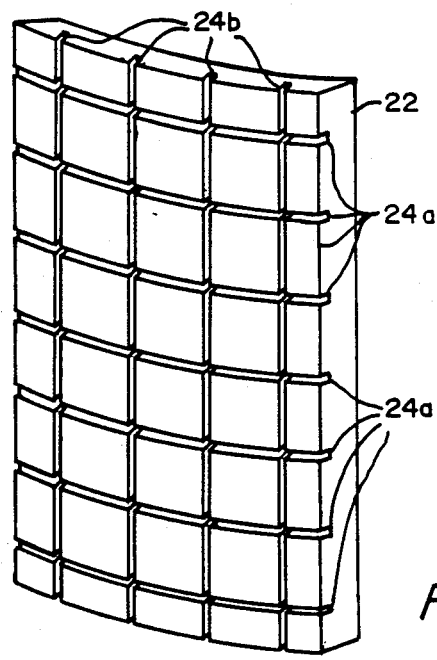
FIG. 3 is an isometric view of a rigid insulator portion of the tile of FIG. 2 having a plurality of longitudinal and latitudinal channels provided in a first surface thereof.

Referring now to FIG. 2, a tile 20 for use as a thermally protective barrier for the missile of FIG. 1 or other susceptible structure is shown to include a thermally insulating layer 22, typically 3 mm to 15 mm thick, comprising a rigid, nonporous material and an ablating layer 30, typically 3 mm to 10 mm thick, comprising a rigid, nonporous ablative material. The thermally insulating layer 22 is shown having a plurality of latitudinal passageways 24a and longitudinal passageways 24b provided in a first surface 22a thereof. Here these passageways 24a, 24b are provided by machining shallow channels approximately 1 mm deep and 1 mm wide into the first surface 22a of insulating layer 22. These channels may be provided by machining with a diamond saw and are spaced at regular intervals in the range of 5 mm to 20 mm apart, for example. The ablating layer 30 is bonded to the insulator layer 24 by use of a layer of bonding material 28, here preferably a graphite cement having adhesive properties to 3000° K. Here the graphite cement used is Great Lakes No. C-40 which may be obtained from Great Lakes Carbon Co., Niagara Falls, NY. This particular graphite cement chosen is a thick liquid which is applied to the surfaces 22a, 30a and cured at room temperature. Prior to application of the cement, however, means are provided within the channels 24a, 24b of insulating layer 22 to prevent cement or other bonding agent from lodging in and blocking the channels 24a, 24b. One example of means suitable for preventing the bonding agent from blocking the channels is string or twine. The string or twine is disposed in the channels prior to application of the cement layer 28. The cement 28 is then applied to both the surfaces 22a, 30a of the insulating layer 22 and ablating layer 30, respectively. The layers 22 and 30 are clamped together and the string or twine is pulled through the channels before the cement sets. The string or twine is used to clear out any cement from the channels, thus preventing blockage of the channels by the cement. This arrangement of channels permits pyrolysis gases, generated during operation, to be vented from the bond interface thereby preventing bond failure.

The ablating layer 30, as well as the insulating layer 22, are provided with a desired contour in accordance with the contour of the casing 40 (FIGS. 4, 5) of the missile 16. Furthermore, the edge surfaces 20a, 20b of each one of said tiles are mortised and tenoned using conventional machining techniques. Here, the mortised and tenoned edges are in the shape of V and complimentary V grooves to prevent line of sight exposure of the missile casing to a laser beam while still providing gaps 34 (FIGS. 4, 5) between adjacent tiles for venting of pyrolysis gases. Other types of joints may alternatively be used to prevent line of sight exposure. For example, dove-tailed joints, rabbeted, or shiplapped joints may also be used.

Figure 4:
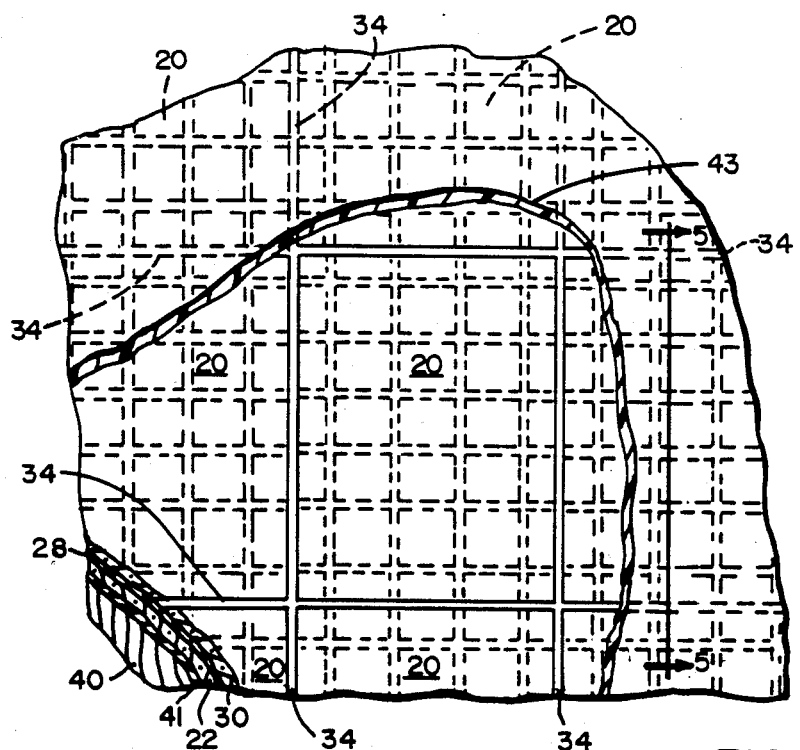
FIG. 4 is a plan view of a portion of a missile casing showing one arrangement of tiles with gaps provided between edges of adjacent tiles for venting of pyrolysis gases in accordance with a further aspect of the present invention.
Figure 5:
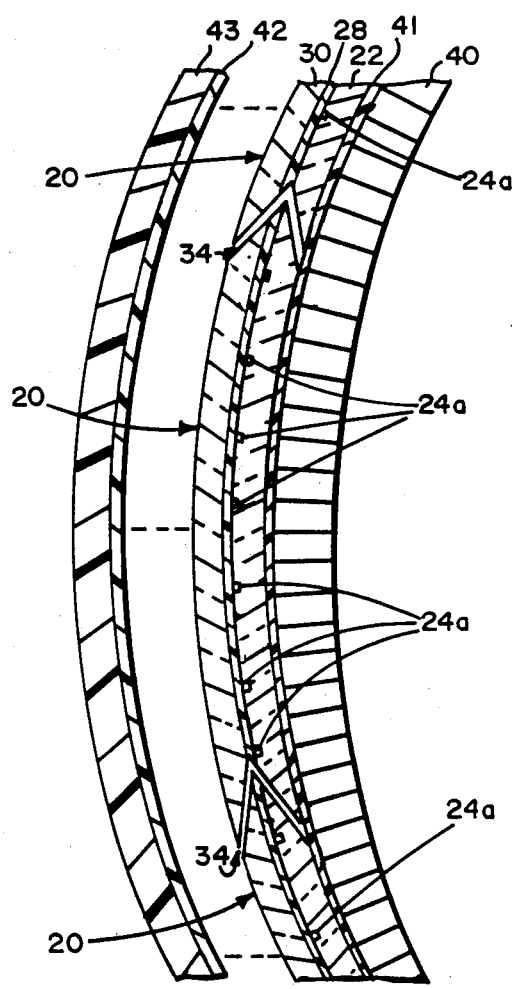
FIG. 5 is a cross-sectional view taken along lines 5—5 of FIG. 4 showing the missile casing having bonded thereto a plurality of tiles in accordance with the present invention.

Referring now to FIGS. 4 and 5, one possible arrangement of tiles 20 to provide a thermally protective covering 35 for a missile casing is shown. Here, the tiles 20 are disposed over the casing 40 of the missile 16. Each tile 20 is arranged such that the mortised and tenoned edges of adjacent tiles are fitted together to provide gaps 34 between the tiles. The mortised and tenoned edges, however, prevent a direct line of sight to the missile casing through gaps 34. The gaps 34 in conjunction with channels 24a, 24b provide means for venting pyrolysis gases as will now be described.

Referring more particularly to FIG. 5, the tiles 20 are shown bonded to the casing 40 of the missile 16. The casing may be fabricated of a composite material or a metal such as aluminum as shown. A suitable bonding agent such as a room temperature vulcanize (RTV) rubber is provided between the second surface of insulator layer 22 and the casing 40. The RTV rubber is used to provide sufficient mechanical damping and sufficient thermocompression strain relief to insure that the tiles remain suitably fastened to the missile casing during operation, as well as, exposure to variant temperature environments. As further shown, a protective layer or sheath 43 here comprising a sheet of rubber is fastened via a layer of an RTV rubber 42 to the outer surface of the tiles 20. The rubber layer 43 serves to protect the tiles during launch from high temperature exhaust and pebbles (etc.). Further, the sheath provides a long term moisture protective coating, thereby preventing degradation of the tile surface during storage in a missile silo, for example.

Figure 6:
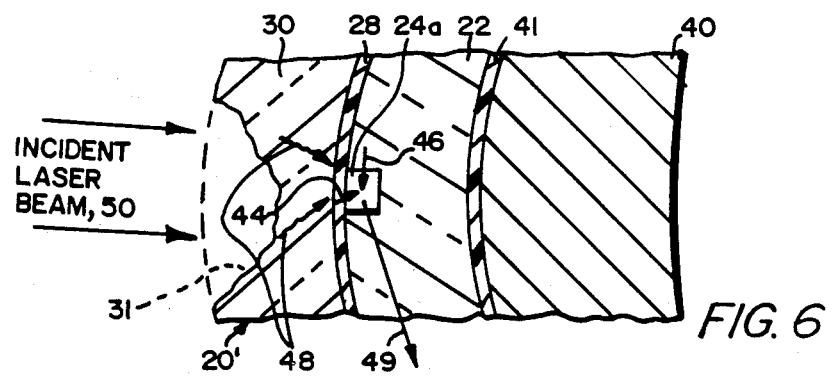
FIG. 6 is a cross-sectional diagrammatical view of the protective layer for the missile casing under attack by a laser beam, showing ablation of the outer ablating layer and venting of pyrolysis gases in accordance with the further aspect of the present invention.

Referring now to FIG. 6, an incident laser beam 50 is shown impinging upon the surface of ablating layer 30. Ablating layer 30 is shown partially ablated or vaporized away as a result of the laser energy. Produced in response to ablation of layer 30 is heat which (as shown by arrows 48) thermally conducts through ablating layer 30 towards bonding layer 28 and insulating layer 22. In response to this heat (represented by arrows 48) outgassing (shown as arrow 44) occurs from layer 28, as well as, outgassing (shown as arrow 46) occurs from layer 22. The outgassing vapors 44 and 46 are directed towards here channel 24a and emerge from channel 24a via path 49. These vapors are ultimately vented through one of the aforementioned gaps 34 (FIGS. 4, 5) provided between edges of adjacent tiles. With this arrangement, outgassing which occurs in layers 28 and 24 will be vented through the channels 24a, thereby preventing an extremely large build-up of pyrolysis gases between layers 24 and 30 which if not vented could result in failure of the bond layer 28.

Pyrolytic graphite is selected as the preferred material for the ablating layer 30 since pyrolytic graphite has relatively good ablating characteristics, is substantially nonporous and rigid and has nonisotropic thermal conductivity properties. Thus, the pyrolytic graphite layer 30 is chosen such that the graphite layer 30 has a high thermal conductivity in a direction parallel to the surface of casing 40 and a low thermal conductivity in a direction perpendicular to the surface of casing 40. Pyrolytic graphite is generally formed by the pyrolytic decomposition of a hydrocarbon such as methane gas at a very high temperature. The nonisotropic conductivity is generally inherent in crystalline forms of pyrolytic graphite and is believed a result of the tendency of basal planes of pyrolytic graphite to be deposited during material growth parallel to the deposition surface. Other materials may be used as ablating layer 30. For example, a relatively rigid, semi-porous composite having good ablation performance such as composites comprising carbon fibers in a carbon matrix may be used.

The silica phenolic is selected as the preferred material for the insulating layer 22 because silica phenolic is dense, rigid, has a low thermal conductivity, as well as, being substantially nonporous. Furthermore, silica phenolic is a high modulus fiber in particular having a very high tensile strength. Accordingly, the silica phenolic can serve to carry the mechanical load provided from itself, as well as, the ablating layer comprised of pyrolytic graphite. Further, silica phenolic has ablative characteristics which aid in protection of the missile casing. Other materials which may be used as the insulating layer include composites comprising high strength fibers such as glass, silica or "Kevlar" (by Dupont Company, Wilmington, Del.), generally known as aramide incorporated into a thermally insulating matrix comprising phenolic or epoxy.

The graphite cement selected is designed to bond porous surfaces. Since pyrolytic graphite and silica phenolic have substantially nonporous surfaces, prebonding treatments are applied to each of the bonding surfaces of each of said materials when using the selected graphite cement. For the silica phenolic, the surface to be bonded is lightly sandblasted to provide a semi-porous bonding surface. For the pyrolytic graphite material, a series of shallow small diameter holes are machined to provide a suitable bonding surface.

Having described preferred embodiments of this invention, it will now be apparent to one of skill in the art that other embodiments incorporating its concept may be used. It is felt, therefore, that this invention should not be limited to the disclosed embodiments, but rather should be limited only by the spirit and scope of the appended claims.

What is claimed is:

1. A thermal protective covering for a casing of a structural element, comprising:
   a thermally ablating layer;
   a rigid, nonporous thermally insulating layer comprising a high modulus fiber incorporated in a thermally insulating matrix bonded between the casing of the structural element and the thermally ablating layer;
   means for venting pyrolysis gases comprising, a plurality of grooves disposed in a surface of a first one of said ablating layer and thermally insulating layer with said surface being bonded to the second one of said ablating layer and thermal insulating layer, said grooves terminating at edge portions of said first layer.

2. The thermally protective covering of claim 1 wherein the thermally ablative layer comprises a material selected from the group consisting of pyrolytic graphite and a carbon composite comprising carbon fibers incorporated in a carbon matrix.

3. The thermally protective covering of claim 2 wherein the thermally ablating layer is pyrolytic graphite.

4. The thermally protective covering of claim 3 wherein the high modulus fiber is selected for the group consisting of glass, silica and aramide.

5. The thermally protective covering of claim 3 wherein the thermally insulating matrix is selected from the group consisting of epoxy and phenolic.

6. The thermally protective covering of claim 2 wherein the insulating layer comprises silica fibers in a phenolic resin matrix.

7. The thermally protective covering of claim 3 wherein the insulating layer comprises silica fibers in a phenolic resin matrix.

8. A thermal protection covering for a casing comprising:
   a plurality of tiles, each tile comprising:
   (i) a thermally ablating layer;
   (ii) a thermally insulating layer comprising a rigid, nonporous thermally insulating material comprising a high modulus fiber incorporated in a thermally insulating matrix, said layer having a first surface bonded with graphite cement to said thermally ablating layer, said first surface having a plurality of channels disposed in said first surface and terminating at corresponding edges of said thermally insulating layer; and
   wherein said tiles are bonded to said casing and arranged to provide a gap between pairs of adjacent edges of corresponding pairs of adjacent tiles.

9. A thermal protection covering for a casing comprising:
   a plurality of tiles, each tile comprising:
   (i) a thermally ablating layer;
   (ii) a thermally insulating layer comprising a high modulus fiber incorporated in a thermally insulating matrix, said layer having a first surface bonded to said thermally ablating layer said first surface having a plurality of channels disposed in said first surface and terminating at corresponding edges of said thermally insulating layer; and wherein said tiles are bonded to said casing and arranged to provide a gap between each of pairs of adjacent edges of corresponding pairs of adjacent tiles.

10. The thermal protection covering of claim 9 wherein said gaps are provided not having a direct line of sight between an outer surface of the thermally ablating layer and the casing.

11. The thermal protection covering of claim 10 wherein each gap between edges of adjacent tiles and the channels disposed in the first surface of the insulator layer of each tile provide passageways for venting of pyrolysis gases produced when the protective covering is exposed to a high intensity energy source.

12. The thermally protective covering of claim 11 wherein the thermally ablative layer comprises a material selected from the group consisting of pyrolytic graphite and a carbon composite comprising carbon fibers incorporated in a carbon matrix.

13. The thermally protective covering of claim 12 wherein the thermally ablating layer is pyrolytic graphite.

14. The thermally protective covering of claim 11 wherein the thermally insulating layer comprises a composite material of a high modulus fiber incorporated in a thermally insulating matrix.

15. The thermally protective covering of claim 14 wherein the high modulus fiber is selected from the group consisting of glass, silica and aramide.

16. The thermally protective covering of claim 15 wherein the thermally insulating matrix is selected from the group consisting of epoxy and phenolic.

17. The thermally protective covering of claim 12 wherein the insulating layer comprises silica fibers in a phenolic resin matrix.

18. A thermally protective covering for a casing comprising:
a plurality of tiles, each tile comprising:
(i) a thermally ablating layer comprising a nonporous material;
(ii) a rigid nonporous thermally insulating layer comprising a composite material of a high modulus fiber incorporated in a thermally insulating matrix
means for bonding each tile to said casing; and
means for venting pyrolytic gases produced when the protective layer is exposed to a high intensity energy source.

19. The thermally protective covering of claim 18 wherein the thermally ablative layer comprises a material selected from the group consisting of pyrolytic graphite and a carbon composite comprising carbon fibers incorporated in a carbon matrix.

20. The thermally protective covering of claim 18 wherein said thermally ablating layer is pyrolytic graphite and said thermally insulating layer comprises silica fibers in a phenolic resin matrix.

* * * * *